United States Patent
Etzler (10) Patent No.: US 9,777,864 B2
(45) Date of Patent: Oct. 3, 2017

(54) METHOD AND DEVICE FOR CONTROLLING A SOLENOID ACTUATOR

(71) Applicant: Continental Automotive Systems, Inc., Auburn Hills, MI (US)

(72) Inventor: Dirk Etzler, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/833,995

(22) Filed: Aug. 24, 2015

(65) Prior Publication Data

US 2016/0069466 A1     Mar. 10, 2016

Related U.S. Application Data

(60) Provisional application No. 62/048,446, filed on Sep. 10, 2014.

(51) Int. Cl.
| | |
|---|---|
| *H01H 47/22* | (2006.01) |
| *H01H 47/32* | (2006.01) |
| *F16K 31/06* | (2006.01) |
| *F01L 9/04* | (2006.01) |
| *F02M 51/06* | (2006.01) |
| *H01H 47/00* | (2006.01) |

(52) U.S. Cl.
CPC ............ *F16K 31/0644* (2013.01); *F01L 9/04* (2013.01); *F02M 51/061* (2013.01); *H01H 47/002* (2013.01); *H01H 47/22* (2013.01); *F01L 2009/0403* (2013.01)

(58) Field of Classification Search
CPC ...... H01H 47/22; H01H 47/32; H01H 47/002; H02H 3/08; H02H 3/087; H02H 3/093
USPC .......................................................... 361/187
See application file for complete search history.

(56) References Cited

U.S. PATENT DOCUMENTS

| | | | |
|---|---|---|---|
| 5,134,537 A | | 7/1992 | Buss et al. |
| 5,930,103 A | * | 7/1999 | Heck .................. F01L 9/04 |
| | | | 123/478 |

(Continued)

FOREIGN PATENT DOCUMENTS

| | | |
|---|---|---|
| JP | H089687 | 1/1996 |
| KR | 1019920702089 | 8/1992 |

(Continued)

OTHER PUBLICATIONS

Great Britain Intellectual Property Office Search Report dated Mar. 18, 2015 from corresponding GB Application No. GB1416541.9.

(Continued)

*Primary Examiner* — Dharti Patel (57) ABSTRACT

A solenoid actuator for an injection valve or an intake valve is driven with current control during closed-loop control phases. In between the closed-loop current control, the actuator must be clamped to an opposite voltage so as to quickly decrease the current through the solenoid. The current is measured immediately following the clamping phase so as to determine whether or not the clamping phase resulted in the correct current level. If the measured current indicates an extraneous reduction in the current, the clamping phase duration is shortened for the next activation of this clamping phase. If the measured current indicates an insufficient decrease, the clamping phase duration is lengthened for the next following activation cycle.

18 Claims, 5 Drawing Sheets

(56) References Cited

U.S. PATENT DOCUMENTS

| | | | |
|---|---|---|---|
| 5,937,828 A | 8/1999 | Watanabe | |
| 6,170,506 B1 | 1/2001 | Butwin et al. | |
| 7,832,378 B2 * | 11/2010 | Bolz | F02D 41/20 |
| | | | 123/490 |
| 8,935,114 B2 * | 1/2015 | Beer | F02D 41/20 |
| | | | 123/90.11 |
| 2004/0040545 A1 | 3/2004 | Nasu | |
| 2005/0279780 A1 | 12/2005 | Evans et al. | |
| 2010/0193036 A1 | 8/2010 | Haggenmiller et al. | |
| 2013/0093402 A1 | 4/2013 | Akahane | |

FOREIGN PATENT DOCUMENTS

| | | |
|---|---|---|
| KR | 1019960703265 | 6/1996 |
| KR | 1020080112085 | 12/2008 |

OTHER PUBLICATIONS

Korean Intellectual Property Office Notice of Allowance dated May 23, 2017 for corresponding Korean application No. 10-2015-0128326.

\* cited by examiner

METHOD AND DEVICE FOR CONTROLLING A SOLENOID ACTUATOR

CROSS REFERENCE TO RELATED APPLICATION

This application claims priority to U.S. Provisional Application No. 62/048,446, filed on Sep. 10, 2014.

BACKGROUND OF THE INVENTION

Field of the Invention

The invention lies in the automotive technology field. More specifically, the invention pertains to a method and a device for controlling solenoid actuators that are used for operating injection valves, intake valves, and the like. The invention is particularly directed to current-based solenoid actuator control systems wherein the actuators are driven by control of the current profile.

Figure 1:
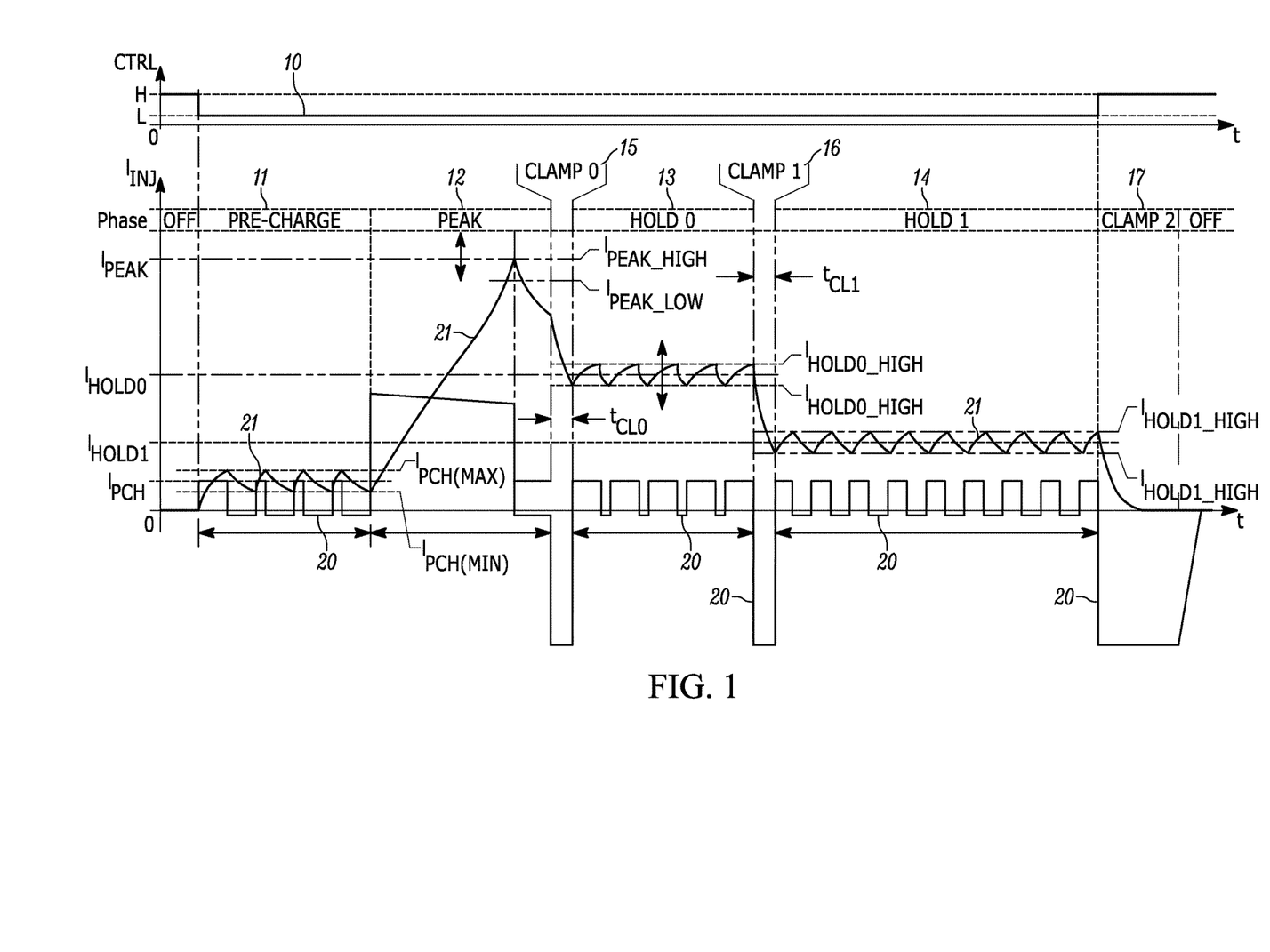
FIG. 1 is a signal/time diagram illustrating a typical current profile for a solenoid actuator.

Solenoid actuators for (direct) injection valves or intake valves are operated by driving a current according to a specified current profile through its coil (e.g. inductive load). By way of example, FIG. 1 shows a typical current profile that is constructed from different sequential phases during which different current levels are applied. The exemplary sequence shows the phases Pre-charge, Peak, Hold0, and Hold1. It will be understood that the illustrated sequence as well as the names of the phases are arbitrarily chosen and might change from one application to another. It is necessary for the preset current levels to be controlled precisely in order to guarantee the targeted performance of the hydraulic system.

One way to control the current during a given phase is to utilize a simple closed-loop current control method switching between an upper set point and a lower current set point. In a corresponding electrical configuration, illustrated in FIG. 2, the nodes of the coil are connected to a high side switch (24) and to a low side switch (25).

Figure 2:
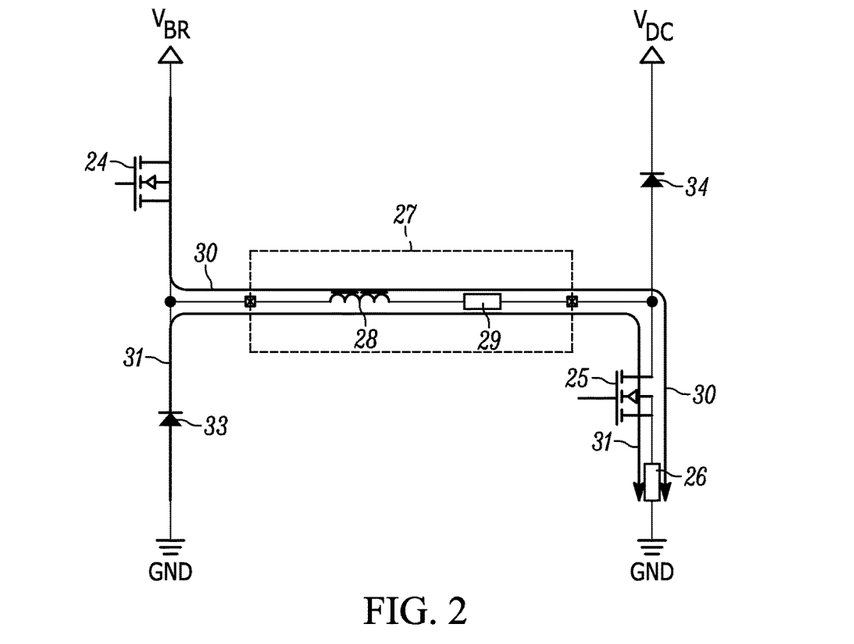
FIG. 2 is a simplified circuit diagram showing the current path through the solenoid of the actuator during PWM phases.

In this setup the high side switch is used to control the current through the coil $I_{INJ}$ by turning on when the current in the coil is below the lower set point and turning off when the current in the coil is above the upper set point. The necessary information regarding the current in the coil is obtained by a shunt (26) between the low side switch (25) and ground GND, which acts as a current sensor. Having the shunt resistor connected to GND in such a way leads to certain advantages with regards to the implementation of the current sense amplifier as well as the sense accuracy that can be obtained in a practical manner (e.g., no "floating" current measurement with high CMRR requirements, thus simpler design and better performance).

In the illustrated setup, however, it is a disadvantage that the low side switch (25) must be turned on in order for the current in the shunt resistor to be equal to the current in the coil. For a typical current profile, however, this cannot be ensured all the time. Three so-called "Clamp" phases (CLAMP0, CLAMP1, CLAMP2) are depicted in FIG. 1 during which a very fast current decay is required. This fast current decay is obtained by turning off the high side switch and the low side switch at the same time, applying reverse DC/DC-voltage (e.g. $-V_{DC}$) to the coil.

Figure 3:
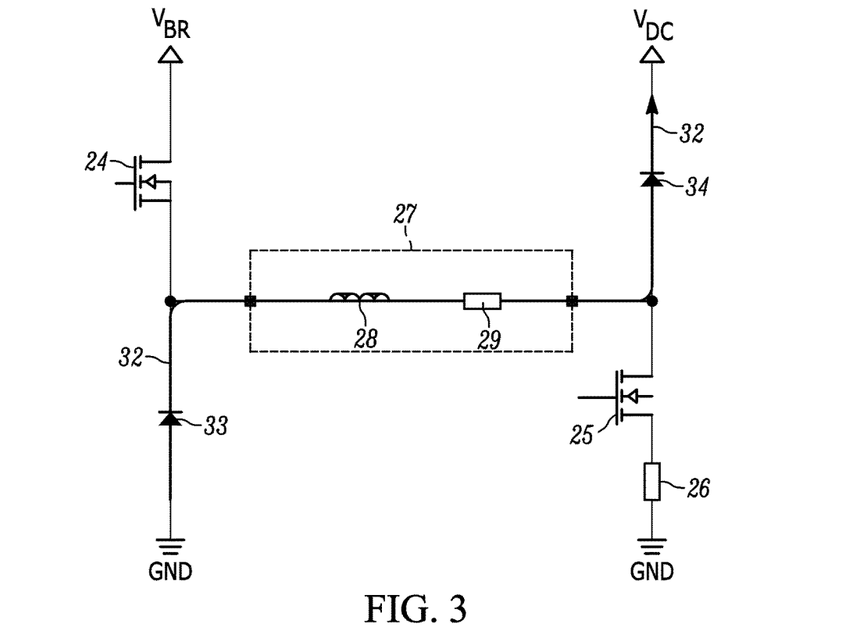
FIG. 3 is a similar diagram showing the current during a clamping phase.

Due to the fact that the low side switch (25) is turned off, no information with regards to the coil current is available during these clamp-phases (see path of current flow during a clamp-phase in FIG. 3). Therefore, the duration of the clamp-phase can be based on a preset phase duration only.

Figure 4A:
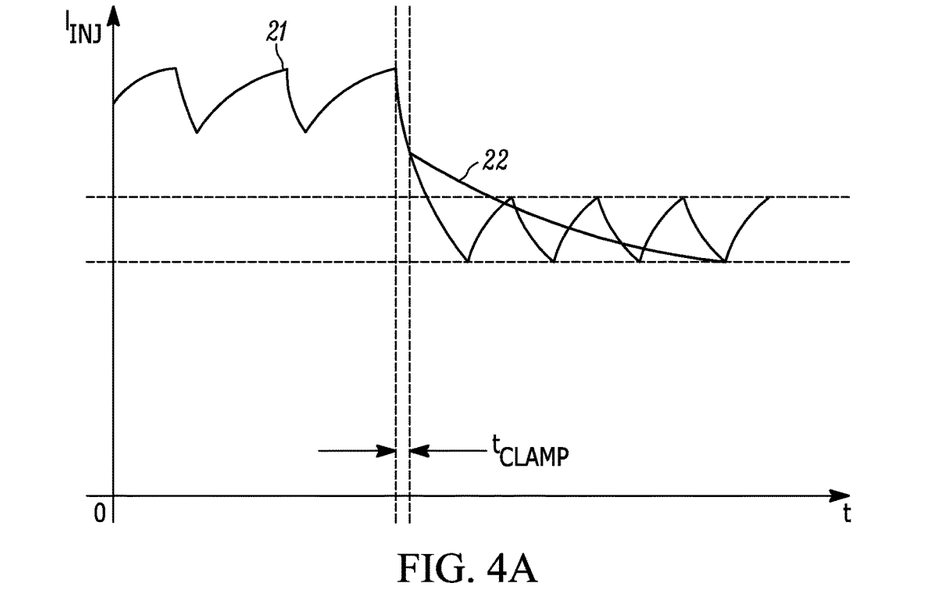
FIG. 4A is a signal diagram showing a current when the clamp-phase time period is too short.

Since, however, the electrical parameters of the coil in terms of resistance and inductance change over time and also with temperature—parameters having a direct impact on the speed of the current decay—a fixed preset duration for the clamping phase might lead to deviations from the desired current profile. These faulty conditions are illustrated in FIG. 4A, where the clamping time is too short to reach the proper current decay, and in FIG. 4B, where the clamping time is too long and the desired current is undershot.

Other factors that have an impact on the current behavior during the clamp-phase are the voltage of the DC/DC-converter or the hydraulic rail pressure of the injection system.

Figure 4B:
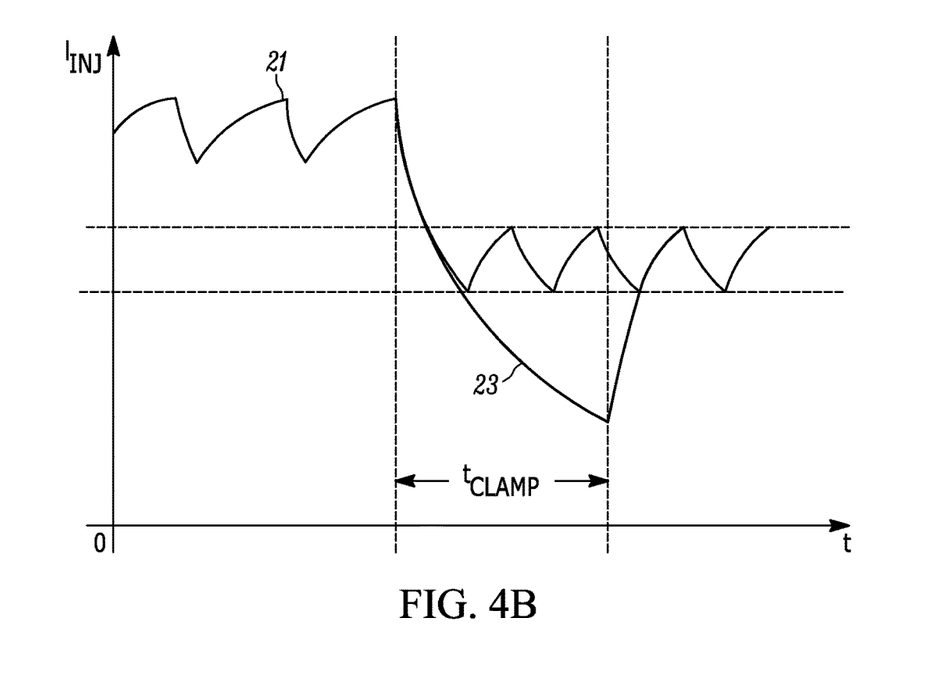
FIG. 4B is a signal diagram showing the current when the clamp-phase time period is too long.

The "under-shoot" case depicted in FIG. 4B, especially, can lead to a closing of the injector and, accordingly, this situation must be prevented under all circumstances. In order to avoid the illustrated deviations from the desired current profile, the clamping time is not a fixed preset value but a function of several parameters that have to be obtained using empirical methods or requiring extensive measurements.

Corresponding prior art solutions are characterized by the implementation of a look-up table with empirical clamp-phase time values that depend on a current temperature, a rail pressure, etc. These characteristic tables or look-up tables are rather complicated and their integration into the control systems require considerable system resources.

BRIEF SUMMARY OF THE INVENTION

It is accordingly an object of the invention to provide a method and device for controlling a solenoid actuator which overcome the disadvantages of the heretofore-known devices of this general type and which provide for an elegant and inexpensive solution to the above problems. It is a particularly desirable object of the invention to provide a look-up table to replace the prior art table that is simpler and smaller in that it only contains appropriate start values for the clamp-phase time (e.g. only limited set of ambient conditions necessary).

With the above and other objects in view there is provided, in accordance with the invention, a method of driving a solenoid actuator, the method comprising:
  connecting a voltage signal to the actuator and causing an electric current to flow through the actuator, the current having mutually different current intensities during temporally offset phases of actuator operation during a given activation cycle;
  selectively operating the actuator during a plurality of temporally subsequent closed-loop current control phases (of a given activation cycle) during which the current is maintained within a given target window defined between a lower current set point and a higher current set point, wherein the current through the actuator is measured and the voltage signal is adjusted to cause the current to remain within the given target window;
  selectively operating the actuator in a clamping phase between two respective closed-loop current control phases, during which clamping phase the current through the actuator is decreased by applying an inverted voltage signal to the actuator for a given clamping time period;
  measuring the current through the actuator immediately following the clamping phase to determine whether the current intensity has overshot or undershot the target window of the subsequent closed-loop current control phase; and generating a redefined clamping time period for a next following activation cycle by one of the following:

if the current intensity has undershot the lower current set point of the target window, decreasing the given clamping time period by a defined unit of time; or if the current intensity has overshot the upper current set point of the target window, increasing the given clamping time period by a defined unit of time; or if the current intensity measured immediately following the clamping phase lies within the target window, retaining the given clamping time as the redefined clamping time period; and operating the actuator in the next following activation cycle with the redefined clamping time period.

By utilizing the information of the coil current immediately after the clamp-phase (i.e., when the low side switch is once more turned on) and adjusting the preset clamp-phase duration automatically for the next activation, the invention removes the need for having an empirical model for the clamp-phase duration to be worked out and implemented.

The invention is based on the presumption that those side conditions (e.g. temperature, life-time, rail pressure, etc.) that lead to a variation of the current decay during the clamp-phase do not change rapidly from one activation to the next. Thus with a given set point for the clamp phase duration the current profile deviates only slowly from the target waveform.

In accordance with an added feature of the invention, the definitive time amount is defined as a smallest time amount available by a temporal resolution of an actuator control system and selectively increasing or decreasing the given time amount by a single smallest time amount for generating the redefined clamping time.

In accordance with an additional feature of the invention, in addition to determining an overshoot or undershoot, an amount of deviation of the current signal from the respective set point signal is measured, and the redefined clamping time is generated by selectively decreasing or increasing the given time amount by an amount that is proportional to the deviation.

In accordance with another feature of the invention, the actuator is driven during the closed-loop current control phases by applying a pulse-width modulated voltage signal to the actuator.

With the above and other objects in view there is provided, in accordance with the invention, a circuit assembly for driving a solenoid actuator, a high side switch for connecting the actuator to a positive potential of a voltage supply and a low side switch for connecting the actuator to ground potential;

wherein, when the high side switch and the low side switch are turned on, an electric current flows through the actuator from the positive voltage potential to ground potential;

a sensor for determining a current intensity of the electric current flowing through the actuator;

a closed-loop control system for controlling the current flowing through the actuator during closed-loop current control phases in a closed-loop control scheme wherein the current intensity is driven in dependence on the current intensity measured by the sensor;

a clamping control for decreasing the current flowing through the actuator during clamping phase during which the high side switch and the low side switch are disconnected and an electric current flows through the actuator with a reversed voltage across the injector; and a circuit responsive to a signal from the sensor and configured to adjust a time period for a clamping phase if a signal from the sensor indicates that the current intensity of the electric current flowing through the actuator immediately following a clamping phase falls outside a predetermined target window.

In accordance with a further feature of the invention, the circuit is an integrating circuit configured to adjust the time period by adding or subtracting a defined unit of time for each adjustment of the time period for the clamping phase.

In accordance with yet a further feature of the invention, the circuit is a proportional integral circuit configured to add or subtract an amount of time proportional to a deviation measured by the sensor for each adjustment of the time period for the clamping phase.

In accordance with again an added feature of the invention, the circuit is configured to generate a redefined clamping time period for a next following clamping phase by one of the following:

if the current intensity measured by the sensor has undershot the lower current set point of the target window, decreasing the given clamping time period by a defined unit of time; or if the current intensity measured by the sensor has overshot the upper current set point of the target window, increasing the given clamping time period by a defined unit of time; or if the current intensity measured immediately following the clamping phase lies within the target window, retaining the given clamping time as the redefined clamping time period.

In accordance with a concomitant feature of the invention, the current sensor is a shunt resistor connected between the low side switch and ground potential.

The general concept is to monitor the current in the coil immediately after the clamp-phase when the low side switch is turned on again (i.e., when the current in the shunt resistor once more reflects the current in the coil) and to use this information to correct/adjust the clamp-phase time for the next activation automatically. If the value of the current in the coil is greater than the upper current set point, the duration for the clamp-phase has to be increased. In contrast, if the value of the current in the coil is smaller than the lower current set point the clamp-phase duration is decreased accordingly. With the next activation the coil current should be between the lower and the upper current set point after the clamp in phase. Otherwise, the time set point is corrected/adjusted until the current moves into the target window.

In a simple implementation of the inventive concept, the deviation of the coil current is classified in any of the following three classes. The coil current is:

(i) smaller than the lower current set point; or
(ii) higher than the upper current set point; or
(iii) between the lower and upper current set points.

Based on the result, the clamp-phase duration set point is (i) decreased by one time resolution step; or
(ii) increased by one time resolution step; or
(iii) held constant.

In its operating principle, this is comparable to a successive-approximation A/D-converter.

In a more sophisticated implementation, the actual deviation between the targeted current set point and the measured current in the coil is used to adjust the clamp-phase duration by a certain amount (e.g., by a multiple of the smallest time unit in the given time resolution). Generally, this approach allows a faster response to deviations but the design is more difficult to design in terms of the stability of the closed-loop control.

A corresponding correction algorithm can be implemented into an already available ASIC that is used to generate the current profile based on user set points for current levels and timings.

Other features which are considered as characteristic for the invention are set forth in the appended claims.

Although the invention is illustrated and described herein as embodied in a current control for a solenoid actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Referring now to the figures of the drawing in detail and first, particularly, to FIG. 1 thereof, there is shown diagram illustrating an exemplary current profile for a solenoid injector. The profile is temporally divided into several different phases. In the illustrated embodiment these include Pre-charge, Peak, Clamp0, Hold0, Clamp1, Hold1 and Clamp2. The sequence and the names are arbitrarily chosen and might vary from application to application. The phases differ in current level, timing and mode of operation.

The activation or activation cycle is commanded by a control signal CTRL 10, which takes a low level L or a high level H. The activation cycle is controlled accordingly, as illustrated in FIG. 1, by driving the actuator voltage 21. The actuator voltage 21 is shown along the bottom of the graph.

The phases 11 (Pre-Charge), 12 (Peak), 13 (Hold0) and 14 (Hold1) are current-controlled phases. The phases 11, 12, 13 and 14 are "current regulated phases" or "closed-loop controlled phases." They are defined by a lower and an upper current level as well as by a duration. During the current-regulated phase the actuator current 21 in the coil is held between the lower and the upper current level ($I_{PHASE(min)}$, $I_{PHASE(max)}$) with the help of a closed-loop control scheme. Here, the information regarding the coil current is required.

The following table contains exemplary parameters regarding the four phases 11, 12, 13 and 14:

|  | Pre-Charge | Peak | Hold0 | Hold1 |
|---|---|---|---|---|
| Actuator Current | $I_{PCH}$ = 1 ... 2.2 A | $I_{PEAK}$ = 10 ... 15 A | $I_{HOLD0}$ = 0 ... 8.7 A | $I_{HOLD1}$ = 0 ... 4.7 A |
| Duration | $t_{PCH}$ = 0 ... 2 ms | $t_{PEAK}$ = 0 ... 0.6 ms | $t_{HOLD0}$ = 0 ... 0.6 ms | $t_{HOLD1}$ = 0 ... 25 ms |

The current control scheme is characterized by the PWM voltage drive signal. The current intensity during the Pre-Charge and Hold phases is adjusted by way of the duty factor of the actuator voltage.

The intermediate phases 15 and 16 (CLAMP0, CLAMP1) and the final phase 17 (CLAMP2) are timed "OFF"-phases. They are defined by a duration only. Since no current information is available (i.e., the low side switch 25 is disconnected), the current cannot be controlled by closed-loop control during these phases.

By way of example, the clamp phases CLAMP0 and CLAMP1 may last for a time period $t_{CL0} = t_{CL1} = 0$ to 40 µs. However, due to a variety of factors, as mentioned above, the time for the clamp phases cannot be set with a fixed duration. The clamp time adjustment according to the invention will become clear from the following.

FIG. 2 illustrates a typical electrical setup of a high side switch 24, a low side switch 25, shunt resistor 26, which also acts as a current sensor. The circuit drives a solenoid injector (INJ) in a direct injection solenoid control driver application. The injector is controlled by a solenoid actuator 27, which, in circuit terms, includes an inductance 28 and a resistance 29. The actuator current information in these situations is available as the voltage across the shunt resistor in the low side path. In this case, current-controlled operation is possible.

FIG. 2 shows a current path 30, which results when the high side switch 24 is turned on. The current path 31 pertains to the case when the high side switch 24 is turned off. In both cases, the current flows through the low side switch 25 and through the shunt resistor 26. In these cases, the shunt resistor 26 is able to sense the intensity of the current and provide the corresponding information to the control system, so as to enable the closed-loop current control.

Additionally connected diodes 33 and 34 allow uninterrupted current flow through the inductive load when the high side switch 24 and/or the low side switch 25 are turned off.

FIG. 3 shows the same electrical circuit setup and illustrates a current path 32 during a clamp-phase. Here, the high side switch 24 and the low side switch 25 are turned off. The current through the shunt resistor 26 is thus equal to zero. The shunt resistor is not able to provide any current sensing information to the control system. Accordingly, only time-controlled operation is possible.

FIG. 4A and FIG. 4B are graphs illustrating the injector current $I_{INJ}$ over time t. The sawtooth signal 21 illustrates the correct clamp time $t_{CLAMP}$. That is, if the system is clamped for the correct amount of time between the phases 13 and 14, the current intensity will properly decrease to the designated current $I_{HOLD1(min)}$ before it rises again to $I_{HOLD1(max)}$ during the holding phase HOLD1.

If, however, the clamp time is too short, the current 21 will not properly decrease within the designated time frame. This is illustrated in FIG. 4A. The signal 22 results from an abbreviated clamp time duration and it is considered an unacceptable deviation of coil current from the target current profile. This situation is referred to as an over-shoot. That is, at the end of the clamp-phase the current 22 in the coil is still higher than the upper current set point $I_{HOLDn(max)}$ for the subsequent hold-phase. The duration of the preceding clamp-phase is too short to allow the coil current to decrease below the targeted upper current set point. This has an impact on certain components in terms of power loss.

FIG. 4B illustrates the under-shoot situation. At the end of the clamp-phase the current 23 in the coil is already smaller than the lower current set point for the subsequent hold-phase. The duration of the preceding clamp phase is too long to keep the coil current above the targeted lower current set point $I_{HOLDn(min)}$. This has an impact on the performance of the hydraulic system (e.g. injector might be closing). Especially the under-shoot should be avoided.

Figure 5:
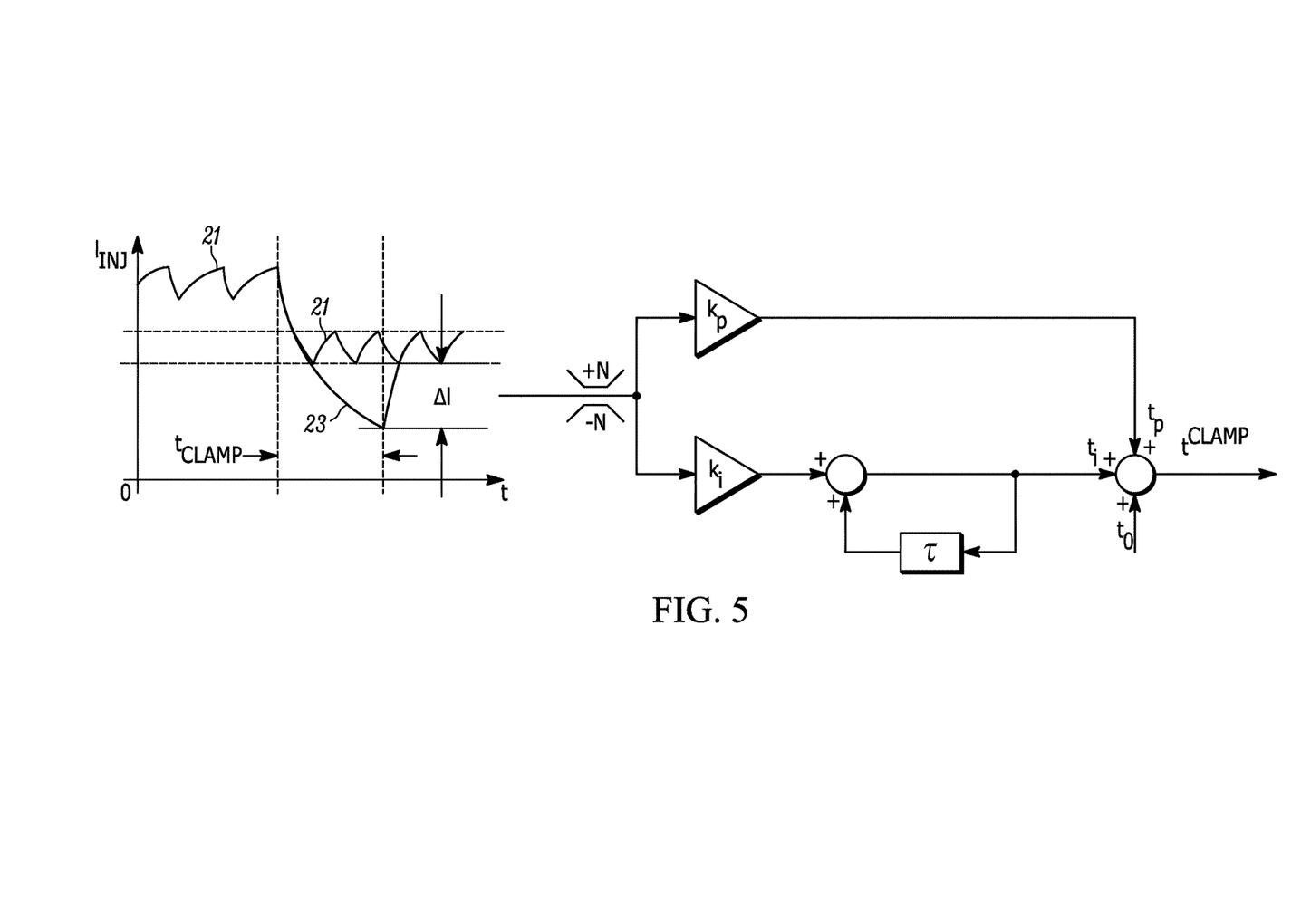
FIG. 5 is a schematic circuit diagram of an exemplary embodiment of a circuit according to the invention.

Referring now to FIG. 5, there is shown a simple block diagram of an equivalent circuit in which the correction/adjustment concept according to the invention is illustrated. This is achieved with a current discriminator and a clamp-phase time offset generation.

The original problem is that the coil current information is not available all the time, so as to allow the closed-loop control scheme to execute continuously. One solution to the problem is to place the current sense device (e.g., shunt resistor) directly into the load path. Then correct coil current information is available at any given time-even if the low side switch is turned off. This, however, triggers the issue of a "floating" current sense which must be implemented with high accuracy. The impact on implementation costs, for example, is considerable.

It is also possible for shunt resistors to be placed in such a way that the coil current can be reconstructed from the obtained current information pieces. Depending on which component is conducting, the coil current is reconstructed from the corresponding current piece. While this solution works around the original problem of not having the current available all the time, a considerable number of additional components are required. Again, the impact on component costs and necessary PCB space is considerable.

The invention provides an elegant solution to these issues. Here, no additional shunt resistors and power components are necessary and, accordingly, the implementation cost for power components is not impacted.

Figure 6:
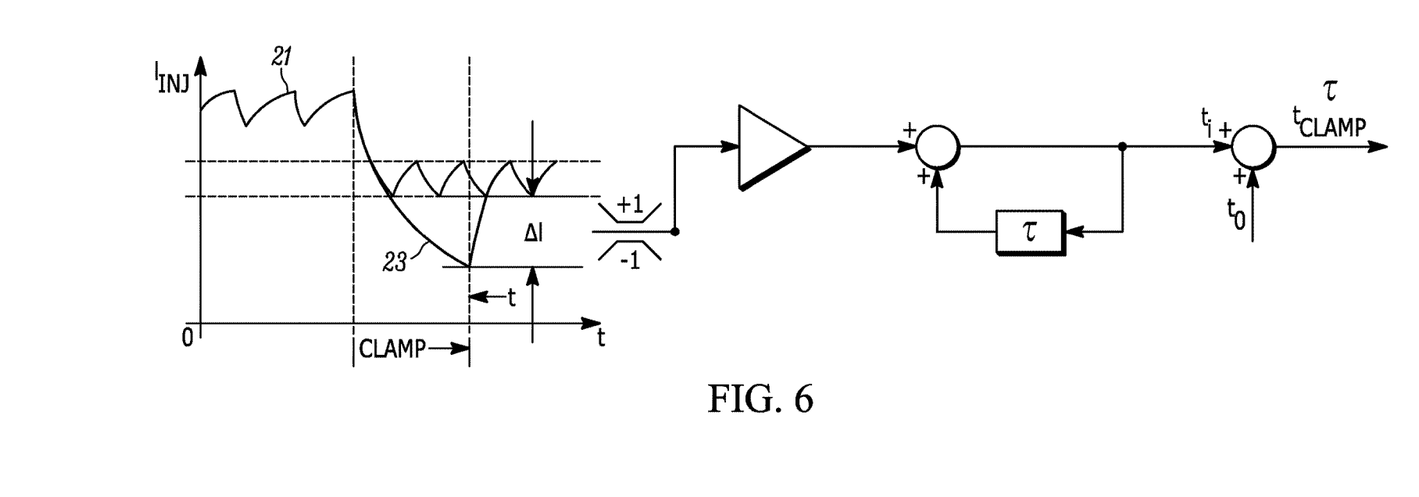
FIG. 6 is a schematic circuit diagram of a further development of the embodiment of the circuit of FIG. 5.
Figure 7:
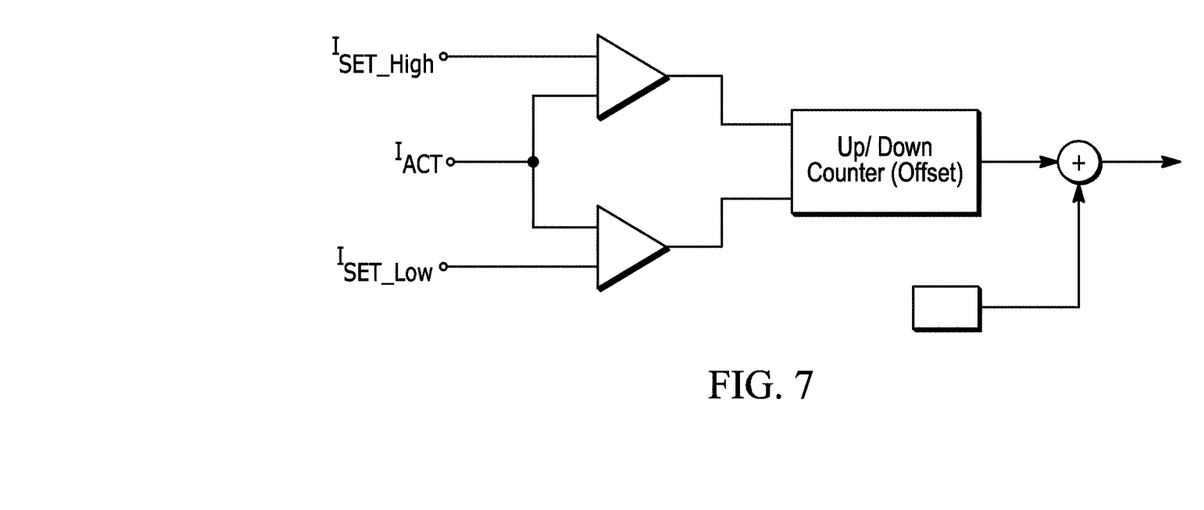
FIG. 7 is a block diagram of a modification of the circuit of FIG. 6, illustrating the correction and adjustment principle in generalized terms.

Referring now to FIGS. 5, 6 and 7, the novel solution can be implemented into a digital domain (e.g. VHDL code) of already existing driver ASIC. Given today's ASIC technology and gate density for these ASIC the cost impact is quite negligible.

FIG. 5 illustrates a most generalized case of the invention. Here, the system has an integral path and a proportional path. The deviation from the target window is also measured in value. If a deviation is determined, the clamp time is adapted by an integral part (op-amp $k_i$) and also by a proportional part (op-amp $k_p$). The clamp time duration is adjusted until the actuator current comes to lie inside the target window. As opposed to the relatively simple integration of FIG. 6, illustrated below, the solution of FIG. 5 provides for a faster clamp time adaptation.

The invention is based on the concept that current information is immediately available following the clamp phase, as soon as the further current-controlled phase starts. The deviation from the target window ($I_{HOLDn(min)} - I_{HOLDn(max)}$) is used to adjust the clamp time for the next activation cycle (e.g., CLAMP0$_n$-->CLAMP0$_{n+1}$). Depending on whether the signal is measured below the target window or above the target window, the clamp time is increased or decreased by one time unit (+1, −1) in an integrating step. If the signal is measured inside the window, the clamp time is not adjusted (0). The adjustment in the circuit of FIG. 6 is a gradual adjustment, as the clamp time duration is adjusted by one single time quantum (smallest time unit according to the resolution) at a time. The solution is preferred for environments with relatively slowly changing parameters.

FIG. 7 is a block diagram illustrating the correction principle according to the invention in an implementation derived from the block circuit of FIG. 6.

The invention claimed is:

1. A method of driving a solenoid actuator, the method comprising:
    connecting a voltage signal to the actuator and causing an electric current to flow through the actuator, the current having mutually different current intensities during temporally offset phases of actuator operation;
    selectively operating the actuator during a plurality of temporally subsequent closed-loop current control phases during which the current is maintained within a given target window defined between a lower current set point and an upper current set point, wherein the current through the actuator is measured and the voltage signal is adjusted to cause the current to remain within the given target window;
    selectively operating the actuator in a clamping phase between two respective closed-loop current control phases, during which clamping phase the current through the actuator is decreased by applying an inverted voltage signal to the actuator for a given clamping time period;
    measuring the current through the actuator immediately following the clamping phase to determine whether the current intensity has undershot or overshot the target window of the subsequent closed-loop current control phase; and
    generating a redefined clamping time period for a next following activation cycle by one of the following:
        if the current intensity has undershot the lower current set point of the target window, decreasing the given clamping time period by a defined unit of time; or
        if the current intensity has overshot the upper current set point of the target window, increasing the given clamping time period by a defined unit of time; or
        if the current intensity measured immediately following the clamping phase lies within the target window, retaining the given clamping time period as the redefined clamping time period; and
    operating the actuator in the next following activation cycle with the redefined clamping time period.

2. The method according to claim 1, which comprises defining the defined unit of time as a smallest time amount available by a temporal resolution of an actuator control system and selectively increasing or decreasing the given clamping time period by the single smallest time amount for generating the redefined clamping time period.

3. The method according to claim 1, which comprises, in addition to determining an undershoot or overshoot, measuring an amount of deviation of the current from the respective set point of the target window, and, in the step of generating the redefined clamping time period, selectively increasing or decreasing the redefined clamping time period by an amount that is proportional to the amount of deviation.

4. The method according to claim 1, which comprises driving the actuator during the closed-loop current control phases by applying a pulse-width modulated (PWM) voltage signal to the actuator.

5. A circuit assembly for driving a solenoid actuator,
a high side switch for connecting the actuator to a positive potential of a voltage supply and a low side switch for connecting the actuator to ground potential;
wherein, when said high side switch and said low side switch are turned on, an electric current flows through the actuator from the positive voltage potential to ground potential;
a sensor for measuring a current intensity of the electric current flowing through the actuator;
a closed-loop control system for controlling the current flowing through the actuator during closed-loop current control phases in a closed-loop control scheme wherein the current intensity is driven in dependence on the current intensity measured by said sensor;
a clamping control for decreasing the current flowing through the actuator during clamping phase during which said high side switch and said low side switch are disconnected and an electric current flows through the actuator with a negative voltage across the actuator; and
a circuit responsive to a signal from said sensor and configured to adjust a time period for a subsequent clamping phase if a signal from said sensor indicates that the current intensity of the electric current flowing through the actuator immediately following a recently completed clamping phase falls outside a predetermined target window.

6. The circuit assembly according to claim 5, wherein said circuit is an integrating circuit configured to adjust the time period by adding or subtracting a defined unit of time for each adjustment of the time period for the subsequent clamping phase.

7. The circuit assembly according to claim 5, wherein said circuit is a proportional integral circuit configured to add or subtract an amount of time proportional to a deviation measured by said sensor for each adjustment of the time period for the subsequent clamping phase.

8. The circuit assembly according to claim 5, wherein said circuit is configured to generate the adjusted time period for the subsequent clamping phase by one of the following:
if the current intensity measured by said sensor has undershot a lower current set point of the target window, decreasing a given clamping time period for the subsequent clamping phase by a defined unit of time; or
if the current intensity measured by said sensor has overshot an upper current set point of the target window, increasing the given clamping time period for the subsequent clamping phase by a defined unit of time; or
if the current intensity measured immediately following the recently completed clamping phase lies within the target window, retaining the given clamping time for the subsequent clamping phase as the adjusted clamping time period.

9. The circuit assembly according to claim 8, wherein the recently completed clamping phase and the closed-loop current control phases are in a first activation cycle and the subsequent clamping phase is in a second activation cycle immediately following the first activation cycle.

10. The circuit assembly according to claim 5, wherein said current sensor is a shunt resistor connected between said low side switch and ground potential.

11. The circuit assembly according to claim 5, wherein the recently completed clamping phase and the closed-loop current control phases are in a first activation cycle and the subsequent clamping phase is in a second activation cycle immediately following the first activation cycle.

12. A circuit assembly for driving a solenoid actuator, comprising:
a high side switch for connecting the actuator to a positive potential of a voltage supply and a low side switch for connecting the actuator to ground potential, wherein when the high side switch and the low side switch are turned on, an electric current flows through the actuator in a first current path from the positive voltage potential to ground potential;
a sensor coupled in the first current path and measuring a current intensity of the current flowing through the actuator;
at least one clamping component coupled to the actuator so that the electric current flows through the actuator in a second current path to or from the ground potential during a clamping phase when the high side switch and the low side switch are turned off, the at least one clamping component decreasing the current flowing through the actuator during the clamping phase with a negative voltage across the actuator, with no current flowing through the sensor during the clamping phase; and
a control system coupled to the high side switch and the low side switch for controlling activation of the high side and low side switches, the control system controlling the current flowing through the actuator during a succession of activation cycles in a closed-loop control scheme, each activation cycle including closed-loop current control phases, wherein closed-loop current control phases in each activation cycle are separated by a clamping phase, a current intensity of the current flowing through the actuator during each closed-loop current control phase is based on the current intensity measured by the sensor, the control system comprising a circuit responsive to the measured current intensity from the sensor and configured to adjust a time period for a clamping phase in a next following activation cycle if the measured current intensity from the sensor indicates that the current intensity of the current flowing through the actuator, immediately following a most recently completed clamping phase, falls outside a predetermined target window.

13. The circuit assembly according to claim 12, wherein the circuit of the control system comprises an integrating circuit configured to adjust the time period for the clamping phase of the next following activation cycle by adding or subtracting a defined unit of time for each adjustment of the time period for the clamping phase of the next following activation cycle.

14. The circuit assembly according to claim 12, wherein the circuit comprises a proportional integral circuit configured to add or subtract an amount of time proportional to a deviation of the current intensity measured by the sensor for each adjustment of the time period for the clamping phase of the next following activation cycle.

15. The circuit assembly according to claim 12, wherein the circuit comprises a proportional integral circuit configured to add or subtract an amount of time proportional to a deviation of the current intensity measured by the sensor for adjusting the time period for the clamping phase of the next following activation cycle.

16. The circuit of claim 15, wherein the control system controls the current in each clamping phase using an open-loop control scheme.

17. The circuit assembly according to claim 12, wherein the circuit is configured to adjust the time period for the clamping phase for the next following activation cycle according to the following:
- if the current intensity measured by the sensor immediately following the most recently completed clamping phase has undershot a lower current set point of the target window, decreasing a given time period for the clamping phase for the next following activation cycle by a defined unit of time;
- if the current intensity measured by the sensor immediately following the most recently completed clamping phase has overshot an upper current set point of the target window, increasing the given time period for the clamping phase for the next following activation cycle by a defined unit of time; and
- if the current intensity measured immediately following the most recently completed clamping phase lies within the target window, retaining the given time period for the clamping phase for the next following activation cycle.

18. The circuit assembly according to claim 12, wherein the current sensor is a shunt resistor connected between the low side switch and ground potential, and the at least one clamping component comprises a first diode coupled to the high side switch and a second diode coupled to the low side switch.

\* \* \* \* \*